(12) United States Patent
Wu

(10) Patent No.: US 12,432,654 B2
(45) Date of Patent: Sep. 30, 2025

(54) WIRELESS ROAMING METHOD AND SYSTEM

(71) Applicant: HANGZHOU EZVIZ SOFTWARE CO., LTD., Hangzhou (CN)

(72) Inventor: Haiding Wu, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 504 days.

(21) Appl. No.: 17/995,771

(22) PCT Filed: Apr. 9, 2021

(86) PCT No.: PCT/CN2021/086108
§ 371 (c)(1),
(2) Date: Oct. 7, 2022

(87) PCT Pub. No.: WO2021/208809
PCT Pub. Date: Oct. 21, 2021

(65) Prior Publication Data
US 2023/0171687 A1 Jun. 1, 2023

(30) Foreign Application Priority Data
Apr. 13, 2020 (CN) .......................... 202010287688.1

(51) Int. Cl.
*H04W 48/20* (2009.01)
*H04B 17/318* (2015.01)
(52) U.S. Cl.
CPC .......... *H04W 48/20* (2013.01); *H04B 17/318* (2015.01)
(58) Field of Classification Search
CPC ..... H04W 48/20; H04W 36/38; H04W 84/12; H04W 8/22; H04W 8/26; H04W 24/08; H04W 48/16; H04B 17/318
See application file for complete search history.

(56) References Cited

U.S. PATENT DOCUMENTS 8,774,150 B1 7/2014 Jeffery et al.
2010/0165897 A1* 7/2010 Sood ....................... H04L 49/90
370/311
(Continued)

FOREIGN PATENT DOCUMENTS

CN 106105322 11/2016
CN 107959963 4/2018
(Continued)

OTHER PUBLICATIONS

IEEE Standard and Information Technology Part 11: Wireless LAN Medium Access Control (MAC) and Physical Layer (PHY) specifications Amendment 8: IEEE 802.11 Wireless Network Management—2011 (Year: 2011).*
(Continued)

*Primary Examiner* — Nizar N Sivji
(74) *Attorney, Agent, or Firm* — NORTON ROSE FULBRIGHT US LLP

(57) ABSTRACT

An wireless roaming method and system are provided. The method is applied to an AP and comprises: acquiring terminal information of each wireless terminal of wireless terminals currently accessing the AP; determining a roaming terminal currently in an active state from the wireless terminals according to the RSSI value and the idle duration of each wireless terminal; determining, for each roaming terminal, wireless roaming protocols supported by the roaming terminal; wherein, the wireless roaming protocols include an 802.11k-based roaming protocol, an 802.11r-based roaming protocol, and an 802.11v-based roaming protocol; performing a roaming operation on the roaming terminal according to the wireless roaming protocols supported by the roaming terminal. In the embodiment, the problem of roaming delay, packet loss or disconnection caused by selecting an inappropriate roaming protocol to realize the roaming of the roaming terminal can be avoided (Continued)

to the maximum extent, thereby improving the roaming experience of the user.

20 Claims, 4 Drawing Sheets

(56) References Cited

U.S. PATENT DOCUMENTS

| | | | |
|---|---|---|---|
| 2012/0044914 A1 | 2/2012 | Chen et al. | |
| 2012/0076118 A1 | 3/2012 | Montemurro et al. | |
| 2012/0224481 A1* | 9/2012 | Babiarz | H04L 47/2408 370/230.1 |
| 2012/0233679 A1* | 9/2012 | Shedrinsky | A61B 5/002 726/7 |
| 2014/0334447 A1 | 11/2014 | Kim et al. | |
| 2015/0373636 A1* | 12/2015 | Karaca | H04L 45/125 370/332 |
| 2018/0160298 A1* | 6/2018 | Wang | H04M 7/006 |
| 2018/0270889 A1* | 9/2018 | Leroux | H04W 52/0209 |
| 2018/0338278 A1* | 11/2018 | Ketonen | H04W 48/20 |
| 2018/0376448 A1* | 12/2018 | Wild | H04W 68/005 |
| 2019/0305835 A1* | 10/2019 | Wang | H04B 7/0617 |
| 2020/0092804 A1* | 3/2020 | Patwardhan | H04W 8/005 |

FOREIGN PATENT DOCUMENTS

| | | | | |
|---|---|---|---|---|
| CN | 107959963 A | * | 4/2018 | H04W 48/16 |
| CN | 108200592 | | 6/2018 | |
| CN | 109699055 | | 4/2019 | |
| CN | 110519816 | | 11/2019 | |
| CN | 110709881 | | 1/2020 | |
| JP | 2013009130 | | 1/2013 | |

OTHER PUBLICATIONS 802.11k, 802.11r, and 802.11v—Apr. 26, 2024 (Year: 2024).*
Contributions to the evolution of next generation WLANs—2017 (Year: 2017).*
Understand 802.11r/11k/11v Fast Roams on 9800 WLCs—2023 (Year: 2023).*
Extended European Search Report issued in corresponding European Application No. 21788030.1, dated Aug. 30, 2023.
International Search Report and Written Opinion issued in Corresponding PCT Application No. PCT/CN2021/086108, dated Jul. 7, 2021 (English Translation provided).

* cited by examiner

WIRELESS ROAMING METHOD AND SYSTEM

CROSS REFERENCE TO RELATED APPLICATIONS

The present application is a national phase application under 35 U.S.C. § 371 of International Application No. PCT/CN2021/086108, filed Apr. 9, 2021, which claims the benefit of priority to Chinese patent application No. 202010287688.1, filed with the China National Intellectual Property Administration on Apr. 13, 2020 and entitled "Wireless roaming method and system", each of which are incorporated herein by reference in their entirety.

The present application claims priority to a Chinese patent application No. 202010287688.1, filed with the China National Intellectual Property Administration on Apr. 13, 2020 and entitled "Wireless roaming method and system", which is incorporated herein by reference in its entirety.

TECHNICAL FIELD

The present application relates to the technical field of communications, and in particular to a wireless roaming method and system.

BACKGROUND

If there are a plurality of wireless access points (AP) with the same Service Set Identifier (SSID) in the coverage area of the Wireless Local Area Network (WLAN), and the service ranges of the APs overlap with each other to a certain extent, the wireless terminal can move in the entire WLAN coverage area, and can automatically find the AP with the largest signal strength nearby and connect to the network through this AP. This process is called wireless roaming. Wireless roaming is a key technology of WLAN and an important basis for realizing the mobility of wireless terminals.

Generally, the roaming of a wireless terminal is implemented based on wireless roaming protocols. The existing wireless roaming protocols include an 802.11k-based roaming protocol, an 802.11v-based roaming protocol, and an 802.11r-based roaming protocol. For wireless terminals, some wireless terminals may support the above three roaming protocols at the same time, and some wireless terminals may only support one or two of them.

For the case where the wireless terminal can support two or three roaming protocols, the routers in the prior art deal with this situation in a confusing way, and there is no clear roaming scheme, in this way, it may not be possible to realize the roaming of the wireless terminal by using the optimal roaming scheme of the wireless terminal, resulting in the situation of high roaming delay, high packet loss rate or disconnection during the wireless roaming process.

It can be seen from this that when the solution of the prior art is used to realize the roaming of the wireless terminal, the situation of high roaming delay, high packet loss rate or disconnection may occur.

SUMMARY

The purpose of the embodiments of the present application is to provide a wireless roaming method and system, so as to reduce the situation of high roaming delay, high packet loss rate or disconnection during the roaming of the wireless terminal. The specific technical solutions are as follows.

In a first aspect, an embodiment of the present application provides a wireless roaming method, which is applied to a wireless access device AP and includes: acquiring terminal information of each wireless terminal of wireless terminals currently accessing the AP; wherein the terminal information at least includes an RSSI (Received Signal Strength Indication) value and an idle duration of the wireless terminal; determining a roaming terminal currently in an active state from the wireless terminals according to the RSSI value and the idle duration of each wireless terminal; determining, for each roaming terminal, wireless roaming protocols supported by the roaming terminal; wherein the wireless roaming protocols include an 802.11k-based roaming protocol, an 802.11r-based roaming protocol and an 802.11v-based roaming protocol; performing a roaming operation on the roaming terminal according to the wireless roaming protocols supported by the roaming terminal.

In a second aspect, an embodiment of the present application provides a wireless roaming system, which includes an AP and wireless terminals accessing the AP; the AP is configured for acquiring terminal information of each wireless terminal of the wireless terminals; wherein the terminal information at least includes an RSSI (Received Signal Strength Indication) value and an idle duration of the wireless terminal; determining a roaming terminal currently in an active state from the wireless terminals according to the RSSI value and the idle duration of each wireless terminal; determining, for each roaming terminal, wireless roaming protocols supported by the roaming terminal; performing a roaming operation on the roaming terminal according to the wireless roaming protocols supported by the roaming terminal; wherein, the wireless roaming protocols include an 802.11k-based roaming protocol, an 802.11r-based roaming protocol, and an 802.11v-based roaming protocol.

In a third aspect, an embodiment of the present application provides a wireless access device AP, including:

a wireless transceiver, configured for receiving terminal information of each wireless terminal of wireless terminals currently accessing the AP; wherein the terminal information at least includes an RSSI (Received Signal Strength Indication) value and an idle duration of the wireless terminal; a processor, configured for determining a roaming terminal currently in an active state from the wireless terminals according to the RSSI value and the idle duration of each wireless terminal; determining, for each roaming terminal, wireless roaming protocols supported by the roaming terminal; wherein, the wireless roaming protocols include an 802.11k-based roaming protocol, an 802.11r-based roaming protocol, and an 802.11v-based roaming protocol; performing a roaming operation on the roaming terminal according to the wireless roaming protocols supported by the roaming terminal; a processor, configured for storing data during running of the AP.

In a fourth aspect, an embodiment of the present application provides a computer device, including a processor, a communication interface, a memory, and a communication bus, wherein the processor, the communication interface, and the memory communicate with each other through the communication bus; the memory is configured for storing computer programs; and the processor is configured for performing any one wireless roaming method in the present.

In a fifth aspect, an embodiment of the present application provides a computer-readable storage medium storing computer programs that, when executed by a processor, cause the processor to implement any one wireless roaming method in the present application.

In a sixth aspect, an embodiment of the present application provides a computer program product that, when running on a computer, cause the computer to implement any one wireless roaming method in the present application.

The above at least one technical solution utilized by the embodiment of the present application can achieve the following beneficial effects:

By using the technical solution provided by the embodiments of the present invention, for the roaming of a wireless terminal, a roaming operation is performed on the roaming terminal according to the wireless roaming protocols supported by the roaming terminal. Thus, for the roaming of a wireless terminal, the most appropriate roaming protocol is adopted according to the roaming protocol supported by the roaming terminal to realize the roaming of the roaming terminal. In this way, the problem of roaming delay, packet loss or disconnection caused by selecting an inappropriate roaming protocol to realize the roaming of the roaming terminal can be avoided to the maximum extent, thereby improving the roaming experience of the user.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application more apparent, the present application now will be described in detail with reference to the accompanying drawings and the embodiments. Obviously, the embodiments described are only some of the embodiments of the present application instead of all the embodiments. All other embodiments obtained by those of ordinary skills in the art based on the embodiments herein without any creative efforts are within the protection scope of the present application.

The wireless roaming method and apparatus provided by the embodiments of the present application will be described in detail below with reference to the drawings.

First, an embodiment of the present application provides a wireless roaming method, which is used to realize the roaming of each of wireless terminals accessing an AP. Wherein, the method is applied to the AP, that is, the execution subject of the method may be the AP, and specifically, may be a wireless roaming apparatus installed on the AP.

Figure 1:
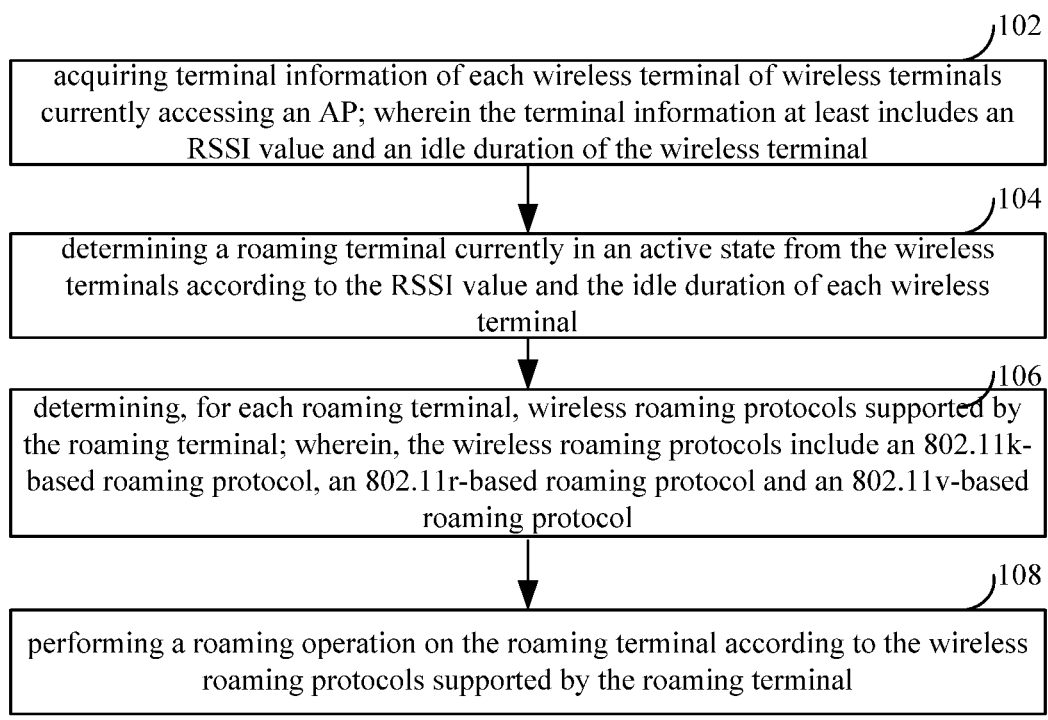
FIG. 1 is a flowchart of a first implementation of a wireless roaming method according to an embodiment of the present application.

FIG. 1 is a flowchart of a first implementation of a wireless roaming method according to an embodiment of the present application. The method shown in FIG. 1 at least includes the following steps.

Step 102, acquiring terminal information of each wireless terminal of wireless terminals currently accessing an AP; wherein the terminal information at least includes an RSSI value and an idle duration of the wireless terminal.

Wherein, the above wireless terminals may be understood as terminals for performing wireless network connection. Specifically, the terminals may be smart devices that can perform wireless network connection, such as a mobile phone, a computer, a tablet computer, and a camera, etc.

The above idle duration may be understood as a duration during which the wireless terminal does not use the network to perform operations. Specifically, the above idle duration may be determined according to the duration during which the wireless terminal and the AP do not interact with each other for messages. In one example, the idle duration of the wireless terminal within a specified duration before the current time may be acquired, and in one example, the total idle duration of the wireless terminal after the wireless terminal is connected to the AP may be acquired. For example, in a specific implementation, when acquiring the terminal information of the wireless terminal A, if the wireless terminal A has not received a message from the AP or has not sent a message to the AP for 30 consecutive seconds up to now, it is determined that the idle duration of the wireless terminal A is 30 seconds. In the embodiment of the present application, it can be determined whether the wireless terminal is in an active state by the idle duration.

The Received Signal Strength Indication (RSSI) value of the wireless terminal can represent the wireless signal strength of the wireless terminal. Therefore, the RSSI value of the wireless terminal can determine whether the wireless terminal is moving away from the currently connected AP.

Of course, in the embodiment of the present application, since the subsequent steps also require message interactions with each of wireless terminals, the terminal information obtained in the above step 102 also includes a Media Access Control Address (MAC) of the wireless terminal.

In a possible implementation, in the embodiment of the present application, the terminal information of a currently accessing wireless terminal (which may also be understood as a currently online wireless terminal) may be periodically acquired. Wherein, the specific length of the above period may be set according to an actual application scenario, which is not limited in this embodiment of the present application.

During specific implementation, the terminal information of the wireless terminal may be acquired through an ioctl interface matched with a wireless driver on the wireless terminal.

Step 104, determining a roaming terminal currently in an active state from the wireless terminals according to the RSSI value and the idle duration of each wireless terminal.

Wherein, the above roaming terminal refers to a wireless terminal in a roaming state. The roaming terminal in an active state may be a roaming terminal whose idle duration is less than or equal to the set duration value.

Generally, if a wireless terminal is in an inactive state, it means that the wireless terminal is not currently performing network operations. Even if the wireless terminal is currently in a roaming state, it is unnecessary to consume resources to realize the roaming of the wireless terminal.

Therefore, in the embodiment of the present application, by screening out the roaming terminals in the active state, the workload of the AP can be reduced, which not only improves the work efficiency of the roaming operation on the roaming terminal in an active state that urgently need to roam, but also saves resources.

Step 106, determining, for each roaming terminal, wireless roaming protocols supported by the roaming terminal; wherein, the wireless roaming protocols include an 802.11k-based roaming protocol, an 802.11r-based roaming protocol and an 802.11v-based roaming protocol.

It can be understood that the wireless roaming protocols herein include the 802.11k-based roaming protocol, the 802.11r-based roaming protocol and the 802.11v-based roaming protocol, which is not intended to impose limitations that each roaming terminal must support the above three wireless roaming protocols at the same time. Instead, it means that in the process of determining the wireless roaming protocols supported by the roaming terminal, the wireless roaming protocols supported by the roaming terminal that need to be determined include the 802.11k-based roaming protocol, the 802.11r-based roaming protocol, and the 802.11v-based roaming protocol.

Step 108: performing a roaming operation on the roaming terminal according to the wireless roaming protocols supported by the roaming terminal.

For any one roaming terminal, perform the wireless roaming protocols supported by the roaming terminal. The AP includes one or more antennas, and can serve multiple roaming terminals through time division multiplexing and/or frequency division multiplexing. Therefore, for any one roaming terminal, the wireless roaming protocols supported by the roaming terminal can be used to perform the roaming operation on the roaming terminal.

In the embodiment of the present application, for the roaming of a wireless terminal, the most appropriate roaming protocol is used according to the roaming protocol supported by the roaming terminal to realize the roaming of the roaming terminal. In this way, the problem of roaming delay, packet loss or disconnection caused by selecting an inappropriate roaming protocol to realize the roaming of the roaming terminal can be avoided to the maximum extent, thereby improving the roaming experience of the user. In addition, the currently active roaming terminal is selected from the wireless terminals to adjust the roaming protocol, compared with adjusting the roaming protocols for all wireless terminals, the resources for adjusting the roaming protocols can be saved, and the limited resources can be used to adjust the roaming protocols for the roaming terminal in an active state, thereby improving the overall communications efficiency.

Figure 2:
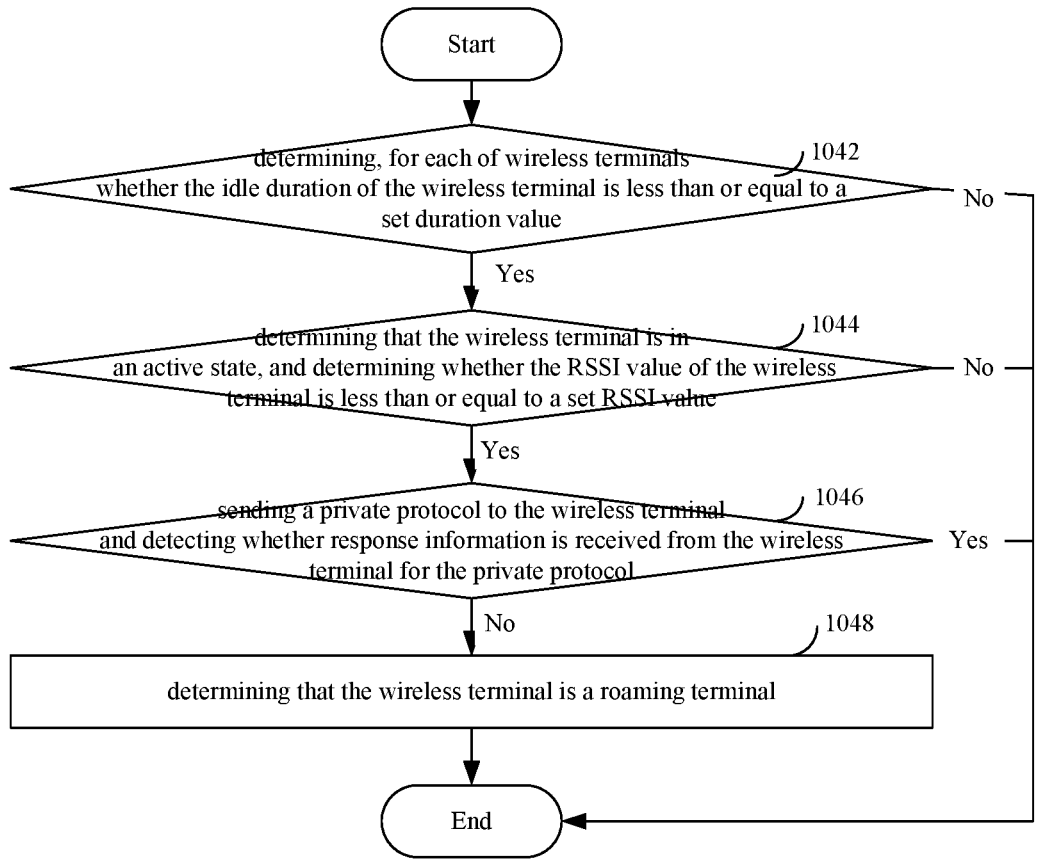
FIG. 2 is a flowchart of a method for determining a roaming terminal in an active state from the accessing wireless terminals in the wireless roaming method according to an embodiment of the present application.

In a possible implementation, in the embodiment of the present application, the above step 104 of determining a roaming terminal currently in an active state from the wireless terminals according to the RSSI value and the idle duration of each wireless terminal specifically includes the following steps, as shown in FIG. 2.

Step 1042, determining, for each wireless terminal of the wireless terminals, whether the idle duration of the wireless terminal is less than or equal to a set duration value; if so, performing step 1044, otherwise, ending the process.

Step 1044, determining that the wireless terminal is in an active state, and determining whether the RSSI value of the wireless terminal is less than or equal to a set RSSI value; if so, performing step 1046, otherwise, ending the process.

Step 1046, sending a private protocol to the wireless terminal, and detecting whether response information is received from the wireless terminal for the private protocol; if not received, performing step 1048; otherwise, ending the process.

Wherein, the above private protocol is used to search the local area network for the wireless terminal of a fixed placement type. The wireless terminal of a fixed placement type can be understood as a wireless terminal that is placed fixedly and does not require roaming, such as a camera. Sending the private protocol to the wireless terminal refers to sending a message to the wireless terminal based on the private protocol. After receiving the message, the wireless terminal returns response information based on the private protocol.

Step 1048, determining that the wireless terminal is a roaming terminal.

In a possible implementation, the specific values of the above set duration value and the set RSSI value may be set according to actual application scenarios, which are not limited in the embodiments of the present application.

For example, in a specific implementation, the above set duration value may be 60 seconds. Correspondingly, if the idle duration of the wireless terminal is less than or equal to 60 seconds, the wireless terminal is considered to be an active terminal. If the idle duration of the wireless terminal is greater than 60 seconds, the wireless terminal is considered not to be an active terminal. It can be understood that this is only an example and does not constitute a limitation on the embodiments of the present application.

Generally, if the RSSI value of the wireless terminal is less than the set RSSI value, it means that the wireless terminal may be moving away from the currently accessed AP or the signal of the wireless local area network suddenly deteriorates, etc. Therefore, only the RSSI value of the wireless terminal cannot determine whether the wireless terminal is a roaming terminal, in this embodiment of the present application, it is necessary to combine a private protocol to determine whether the wireless terminal is a roaming terminal.

In the embodiment of the present application, the above wireless terminal may also be a fixed-placed smart device such as a camera. For the fixed-placed device such as a camera, if the AP sends a private protocol to the fixed-placed device such as the camera, the fixed-placement device such as the camera will return response information for the private protocol to the AP. Therefore, in the embodiment of the present application, if it is determined that the RSSI value of the wireless terminal is less than the set RSSI value, the private protocol continues to be sent to the wireless terminal, and if the response information for the private protocol returned by the wireless terminal is not received, it is considered that the wireless terminal is not a fixed-placed device such as a camera, so it can be determined that the wireless terminal is a roaming terminal.

Of course, in the embodiment of the present application, when determining a roaming terminal currently in an active state from the wireless terminals, the three steps of determining the idle duration, determining the RSSI value and sending the private protocol do not have an execution sequence, that is, the above three steps can be executed in any sequence. The above FIG. 2 is only used for illustration in the sequence of determining the idle duration, determining the RSSI value and sending the private protocol, and does not constitute a limitation on the embodiments of the present application.

In addition, in a specific implementation, the above three steps can also be performed simultaneously, that is, in the embodiment of the present application, for each wireless terminal, it can be simultaneously determined through multithreading whether the wireless terminal satisfies the above three conditions. For ease of understanding, examples will be given below.

For example, in a specific implementation, a first thread, a second thread and a third thread may be invoked at the same time for the wireless terminal A when determining whether the wireless terminal A is a roaming terminal in an active state. Wherein, the step of determining whether the idle duration of the wireless terminal A is less than or equal to the set duration value is performed through the first thread, the step of determining whether the RSSI value of the wireless terminal A is less than or equal to the set RSSI value is performed through the second thread, and the step of sending the private protocol to the wireless terminal A and detecting whether the response information for the private protocol is received from the wireless terminal is performed through the third thread. Finally, it is determined whether the wireless terminal A is a roaming terminal in an active state according to the execution results of the first thread, the second thread and the third thread.

In addition, in the embodiment of the present application, since there may be multiple wireless terminals currently accessing the AP, in order to improve the efficiency of determining the roaming terminal currently in the active state, the number of threads performing each step may be set as more than one. For example, for the above example, there are multiple first threads, second threads, and third threads, so that the queuing duration of each of wireless terminals can be reduced and the efficiency can be improved.

In a possible implementation, in the embodiment of the present application, the above step 106 of determining the wireless roaming protocol supported by the roaming terminal for each roaming terminal specifically includes the following process:

acquiring, for each roaming terminal, protocol-related information of the roaming terminal; extracting protocol-related field information from the above protocol-related information; determining whether the wireless network in the area where the wireless terminal is located is an encrypted network; if so, determining according to the above field information whether the roaming terminal supports the 802.11r-based roaming protocol; if the wireless network is not an encrypted network or the roaming terminal does not support the 802.11r-based roaming protocol, determining whether the roaming terminal supports the 802.11k-based roaming protocol and the 802.11v-based roaming protocol according to the above field information; wherein the above protocol-related information includes driving code information of the roaming terminal and message information sent and received by the roaming terminal.

In one example, the driving code information of the wireless driver of the roaming terminal may be acquired through an ioctl interface matched with the wireless driver, or message information sent and received by the roaming terminal and other information that may be related to the wireless roaming protocol may be acquired. Then the protocol-related field information is extracted from the acquired information, and the wireless roaming protocol supported by the wireless terminal can be determined through the field information. For example, if the extracted field information includes 802.11r, or there are fields related to the working principle of 802.11r, etc., it can be determined that the wireless roaming protocol supported by the roaming terminal is an 802.11r-based roaming protocol.

The working principle of the 802.11r-based roaming protocol is shown as follows.

It is assumed that there are two APs with the same SSID in the current area, and secret keys of these two APs can be the same or different. For the convenience of description, these two APs are recorded as AP1 and AP2 respectively. If the roaming terminal A is closer to AP1 at the beginning, the roaming terminal A will be connected to AP1. When the roaming terminal A is connected to AP1, AP1 will send a message to AP2 to notify AP2 that the roaming terminal A is currently connected to AP1. After AP2 receives the message sent by AP1, AP2 will exchange the secret key with AP1, and this secret key is used to authenticate the roaming terminal A when the roaming terminal A accesses AP2. When the roaming terminal A is gradually approaching AP2, the roaming terminal A will send an authentication request to AP2. In this case, AP2 will authenticate the roaming terminal A based on the secret key obtained before. Therefore, the authentication process takes a short time, so that seamless roaming can be realized.

Since the seamless roaming can be substantially realized by using the 802.11r-based roaming protocol for the roaming of the roaming terminal, when the roaming terminal supports the 802.11r-based roaming protocol, the 802.11r-based roaming protocol is preferred for the roaming of the roaming terminal. Therefore, in a possible implementation, it is possible to first detect whether the roaming terminal supports an 802.11r-based roaming protocol, and if it supports the 802.11r-based roaming protocol, it is unnecessary to detect whether the roaming terminal also supports other roaming protocols.

The precondition for implementing the roaming of the roaming terminal by using the 802.11r-based roaming protocol is that the wireless network in the current area is an encrypted network, for example, it may be encrypted through Wi-Fi Protected Access (WPA). In one example, it is possible to first determine whether the current network is an encrypted network, and if so, detecting whether the above fields contain 802.11r, or whether there is a field related to the working principle of 802.11r, and if so, determining that the wireless roaming protocol supported by the roaming terminal includes an 802.11r-based roaming protocol, and the interpretation process of the roaming protocol can be ended, and it is not necessary to detect whether the roaming terminal supports other roaming protocols; if the current network is not an encrypted network or the detection result according to the above field information is that the roaming terminal does not support the 802.11r-based roaming protocol, it is necessary to detect whether the above field information includes 802.11k or whether there is a field related to the working principle of 802.11k, etc. and detect whether the above field information includes 802.11v or whether there is a field related to the working principle of 802.11v, etc., in order to determine whether the roaming terminal supports the 802.11k-based roaming protocol and the 802.11v-based roaming protocol.

In other implementations, it is also possible to simultaneously detect whether the above field information includes the fields related to the above three roaming protocols, and then, perform different roaming operations according to the detection result.

In the embodiment of the present application, when the wireless roaming protocols supported by the roaming terminal are different, the roaming policies adopted by the roaming terminal are also different. Therefore, the wireless roaming protocols supported by the roaming terminal will be introduced below in different situations.

Situation 1

If the wireless roaming protocols supported by the roaming terminal include an 802.11r-based roaming protocol, in the above step 108, performing the roaming operation on the roaming terminal according to the wireless roaming protocol supported by the roaming terminal specifically includes:

controlling the AP to initiate an roaming operation according to the 802.11r-based roaming protocol.

In this situation, the wireless roaming protocols supported by the roaming terminal include the 802.11r-based roaming protocol. It can be that the roaming terminal only supports 802.11r roaming protocol; or the roaming terminal also supports other wireless roaming protocols in addition to the 802.11r roaming protocol, as long as the wireless roaming protocols supported by the roaming terminal include the 802.11r-based roaming protocol.

In one specific implementation, if it is determined that the wireless roaming protocols supported by the roaming terminal include the 802.11r-based roaming protocol, the AP is controlled to initiate a roaming operation according to the 802.11r-based roaming protocol.

Of course, in other implementations, if it is not determined whether the current area network is an encrypted network when determining the roaming protocol supported by the roaming terminal, it is possible to determine whether the current network is an encrypted network before controlling the AP to initiate the roaming operation according to the 802.11r-based roaming protocol. If the current network is an encrypted network, the AP is controlled to initiate the roaming operation according to the 802.11r-based roaming protocol. If the wireless network in the current area is not an encrypted network, the roaming operation cannot be performed on the roaming terminal based on the 802.11r roaming protocol. In this situation, the roaming operation can be performed on the roaming terminal according to other wireless roaming protocols supported by the roaming terminal.

In addition, since the 802.11r-based roaming protocol is automatically executed, if it is determined for a certain roaming terminal that the 802.11r-based roaming protocol can be used for the roaming operation, it is only required to control the router to enable this function.

In the embodiment of the present application, since it takes very little time by using the 802.11r-based roaming protocol to realize the roaming of the roaming terminal, the seamless roaming can be substantially realized. Therefore, if it is determined that the roaming terminal supports the 802.11r-based roaming protocol and if the wireless network in the current area is an encrypted network, the 802.11r-based roaming protocol is preferred to realize the roaming of the roaming terminal. In this way, the roaming delay can be avoided and seamless roaming can be realized.

Situation 2

If the determined wireless roaming protocol supported by the roaming terminal is an 802.11k-based roaming protocol: in this situation, when realizing the roaming of the roaming terminal, it is necessary to perform message interactions with the wireless terminal, so the terminal information obtained in step 102 also includes the MAC address of the wireless terminal.

In this situation, the above step 108 of performing the roaming operation on the roaming terminal according to the wireless roaming protocols supported by the roaming terminal specifically includes the following steps 1, 2, 3, 4 and 5.

Step 1, determining AP information of each of APs in the area where the roaming terminal is located according to the MAC address of the roaming terminal and the 802.11k-based roaming protocol; wherein, the AP information at least includes a Received Channel Power Indicator (RCPI) value of the AP.

Step 2: determining whether the maximum RCPI value in the RCPI values of the APs is not equal to the RCPI value of the AP currently accessed by the roaming terminal, and determining whether the above maximum RCPI value is greater than a set threshold; if so, performing step 3; otherwise, ending the process.

Step 3: determining whether the wireless roaming protocols supported by the roaming terminal include an 802.11v-based roaming protocol; if so, performing step 4; otherwise, performing step 5.

Step 4: controlling the AP to perform a roaming operation on the roaming terminal based on the 802.11v roaming protocol.

Step 5: controlling the AP to remove the roaming terminal.

Wherein, the specific implementation process of the above step 1 is as follows.

The AP sends a Beacon Request message to the roaming terminal according to the MAC address of the roaming terminal, wherein the Beacon Request message is used to request AP information of the AP in the area where the roaming terminal is located. Of course, information such as the SSID, MAC address, and channel of the AP can be specified in the Beacon Request message. After the roaming terminal receives the Beacon Request message sent by the AP, it returns a Beacon Report message to the AP, and the message carries the AP information of the AP that meets the conditions; wherein the AP information includes the RCPI value of the AP, and of course it may also include the MAC address and channel information of the AP.

After receiving the Beacon Report message returned by the roaming terminal, the AP parses the Beacon Report message, and determines the AP information with the largest RCPI value from the AP information obtained through parsing. Generally, the larger RCPI value of the AP is, the higher the signal quality of the AP is, that is, the smaller the distance between the roaming terminal and the AP is.

Wherein, a possible form of the AP information obtained after parsing the Beacon Report message is as follows:

information of the first AP: MAC1 RCPI1 channel1
information of the second AP: MAC2 RCPI2 channel2
information of the third AP: MAC3 RCPI3 channel3
. . .
information of the N-th AP: MACn RCPIn channel
Wherein, the above N is a positive integer.

In a possible implementation, the two determination processes in the above step 2 may be performed simultaneously, or may be performed sequentially. In a specific implementation, it can be determined whether the maximum RCPI value is not equal to the RCPI value of the AP currently accessed by the roaming terminal. If they are equal, it means that the AP closest to the current roaming terminal is the AP currently connected to the roaming terminal, and roaming is not required, i.e., the process can be ended. If it is determined that the maximum RCPI value is not equal to the RCPI value of the AP currently accessed by the roaming terminal, it continues to determine whether the maximum RCPI value is greater than a set threshold. If it is greater than the set threshold, it means that the roaming terminal is very close to the AP corresponding to the maximum RCPI value. At this time, the roaming terminal can access the AP.

It can be understood that the 802.11v-based roaming protocol can be understood as an protocol for instructing the roaming terminal to access a designated AP. Therefore, in this embodiment of the present application, if the roaming terminal does not support the 802.11v-based roaming protocol, the roaming terminal can only be removed from the current AP, so that the roaming terminal can access the AP with the closest distance.

In one possible implementation, in the embodiment of the present application, controlling the AP to perform a roaming operation on the roaming terminal according to the 802.11v-based roaming protocol specifically includes the following process:

controlling the AP to send access indication information to the roaming terminal; wherein, the access indication information carries the AP information of the AP corresponding to the maximum RCPI value to instruct the roaming terminal to access the above AP based on the AP information; determining whether access response information returned by the roaming terminal is received in a set duration; controlling, if not received, the AP to remove the roaming terminal.

Specifically, in the embodiment of the present application, the access indication information sent to the roaming terminal may be BTM Request message information, wherein the BTM Request message information may carry the MAC address and channel information of the AP indicating the access of the roaming terminal, and the RCPI value of the AP. When the roaming terminal receives the BTM Request message information sent by the AP, it parses the message information to obtain the AP information carried in the message information. If it is connected to the AP, it returns access response information to the AP. The access response information may be BTM Response.

In the embodiment of the present application, the currently connected AP is removed from the roaming terminal, which is equivalent to disconnecting the roaming terminal and the AP, which facilitates the roaming terminal to find and access the AP closest to its current location the AP.

Figure 3:
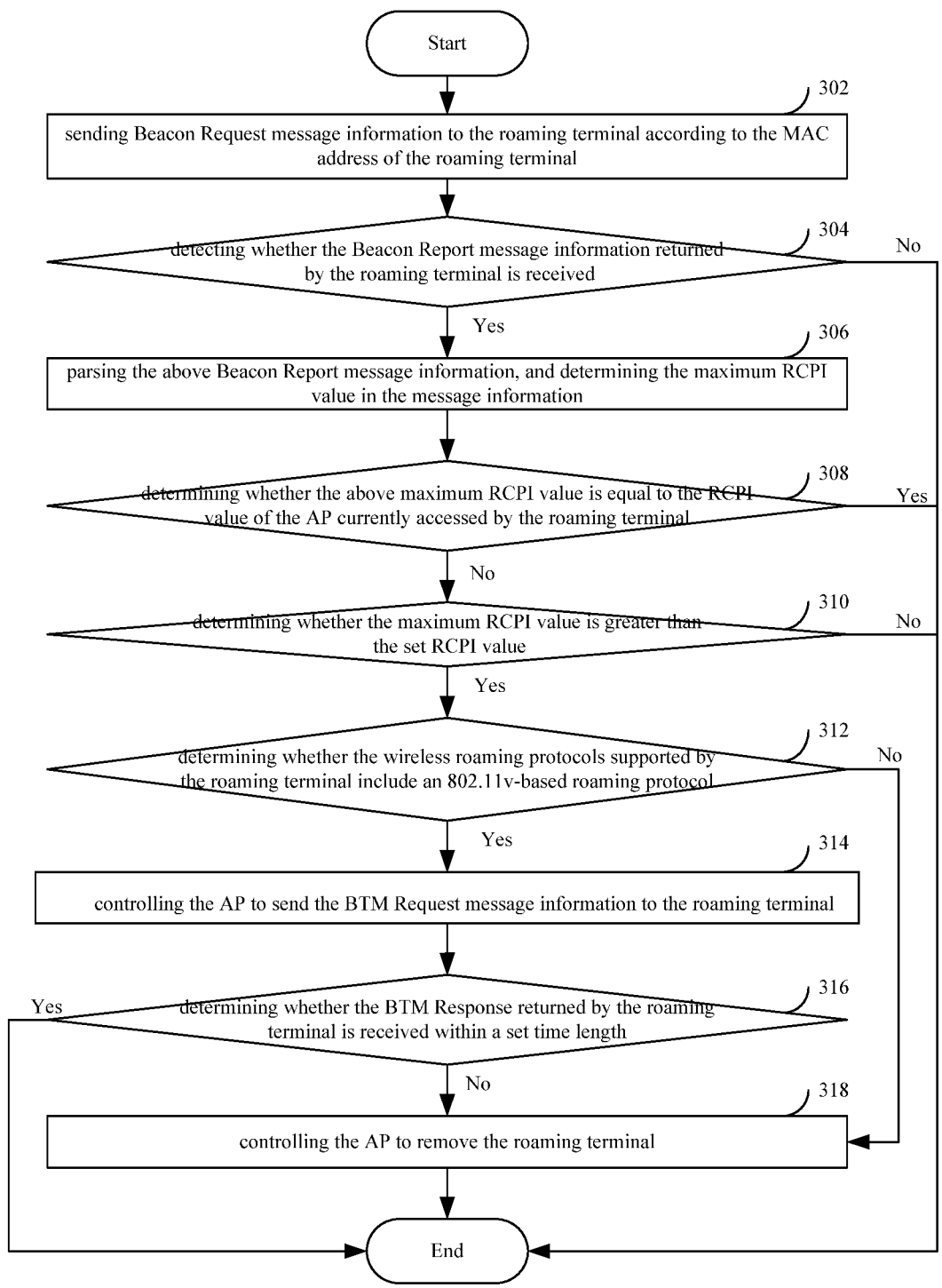
FIG. 3 is a flowchart of a roaming method when the roaming terminal includes an 802.11k-based roaming protocol in the wireless roaming method according to an embodiment of the present application.

In order to facilitate the understanding of a situation in which the wireless roaming protocols supported by the roaming terminal include an 802.11k-based roaming protocol in the embodiment of the present application, the following will be introduced through specific embodiments. FIG. 3 is a flowchart of a roaming method according to a roaming protocol when the wireless roaming protocol supported by the roaming terminal includes an 802.11k-based roaming protocol according to an embodiment of the present application. The method shown in FIG. 3 includes at least the following steps.

Step 302, sending Beacon Request message information to the roaming terminal according to the MAC address of the roaming terminal. Wherein, the above Beacon Request message information is used to request AP information of the AP in the area where the roaming terminal is located.

Step 304, detecting whether the Beacon Report message information returned by the roaming terminal is received, and if so, performing step 306; otherwise, ending the process. Wherein, the Beacon Report message information carries the RCPI value, MAC address, and channel information of each of APs.

Step 306, parsing the above Beacon Report message information, and determining the maximum RCPI value in the message information.

Step 308, determining whether the above maximum RCPI value is equal to the RCPI value of the AP currently accessed by the roaming terminal; if so, ending the process; otherwise, performing step 310.

Step 310, determining whether the maximum RCPI value is greater than the set RCPI value; if so, performing step 312; otherwise, ending the process.

Step 312, determining whether the wireless roaming protocols supported by the roaming terminal include an 802.11v-based roaming protocol; if so, performing step 314; otherwise, performing step 318.

Step 314: controlling the AP to send the BTM Request message information to the roaming terminal.

Wherein, the above BTM Request message information carries AP information of the AP corresponding to the maximum RCPI value, so as to instruct the roaming terminal to access the AP based on the AP information.

Step 316, determining whether the BTM Response returned by the roaming terminal is received within a set time length; if so, ending the process; otherwise, performing step 318.

Step 318, controlling the AP to remove the roaming terminal.

In the embodiment of the present application, when it is determined that the roaming terminal does not support the 802.11v-based roaming protocol, a removal mechanism is introduced. In this way, the roaming terminal is allowed to autonomously find the AP closest to itself for access when the AP cannot realize the roaming of the roaming terminal, thereby improving the roaming success rate of the roaming terminal.

Situation 3

If the determined wireless roaming protocol supported by the roaming terminal is an 802.11k-based roaming protocol:
  correspondingly, in this situation, the above step 108 of performing the roaming operation on the roaming terminal according to the wireless roaming protocols supported by the roaming terminal specifically includes:
  determining whether the RSSI value of the roaming terminal is less than or equal to a set removal threshold; if so, controlling the AP to remove the roaming terminal; otherwise, ending the process and waiting for a next cycle.

Wherein, the specific value of the above set removal threshold may be set according to actual application scenarios, and are not limited in the embodiments of the present application.

In the embodiment of the present application, if the wireless roaming protocol supported by the roaming terminal only includes the 802.11v-based roaming protocol, in this situation, the AP cannot acquire the AP information of all APs in the area where the roaming terminal is located. Therefore, in this situation, the removal process can be entered, that is, the roaming terminal is removed.

Generally, when the RSSI value of the roaming terminal is lower than the set removal threshold, it is indicated that the network signal of the roaming terminal here is poor, and it is substantially unable to carry out normal services. In this situation, removing the roaming terminal can enable the roaming terminal to find the AP closest to itself, thereby improving the roaming success rate.

Situation 4

If the roaming terminal does not support any wireless roaming protocol:
  correspondingly, in this situation, the above step 108 of performing the roaming operation on the roaming terminal according to the wireless roaming protocols supported by the roaming terminal specifically includes:

determining whether the RSSI value of the roaming terminal is less than or equal to a set removal threshold; if so, controlling the AP to remove the roaming terminal.

In the embodiment of the present application, when the roaming terminal does not support any one of the above three roaming protocols, at this time, the AP cannot realize the roaming of the roaming terminal. In this situation, in order to improve the roaming success rate of the roaming terminal, if the RSSI value of the roaming terminal is less than or equal to the set removal threshold, the AP is controlled to remove the roaming terminal, so that the roaming terminal can find the AP closest to itself.

Figure 4:
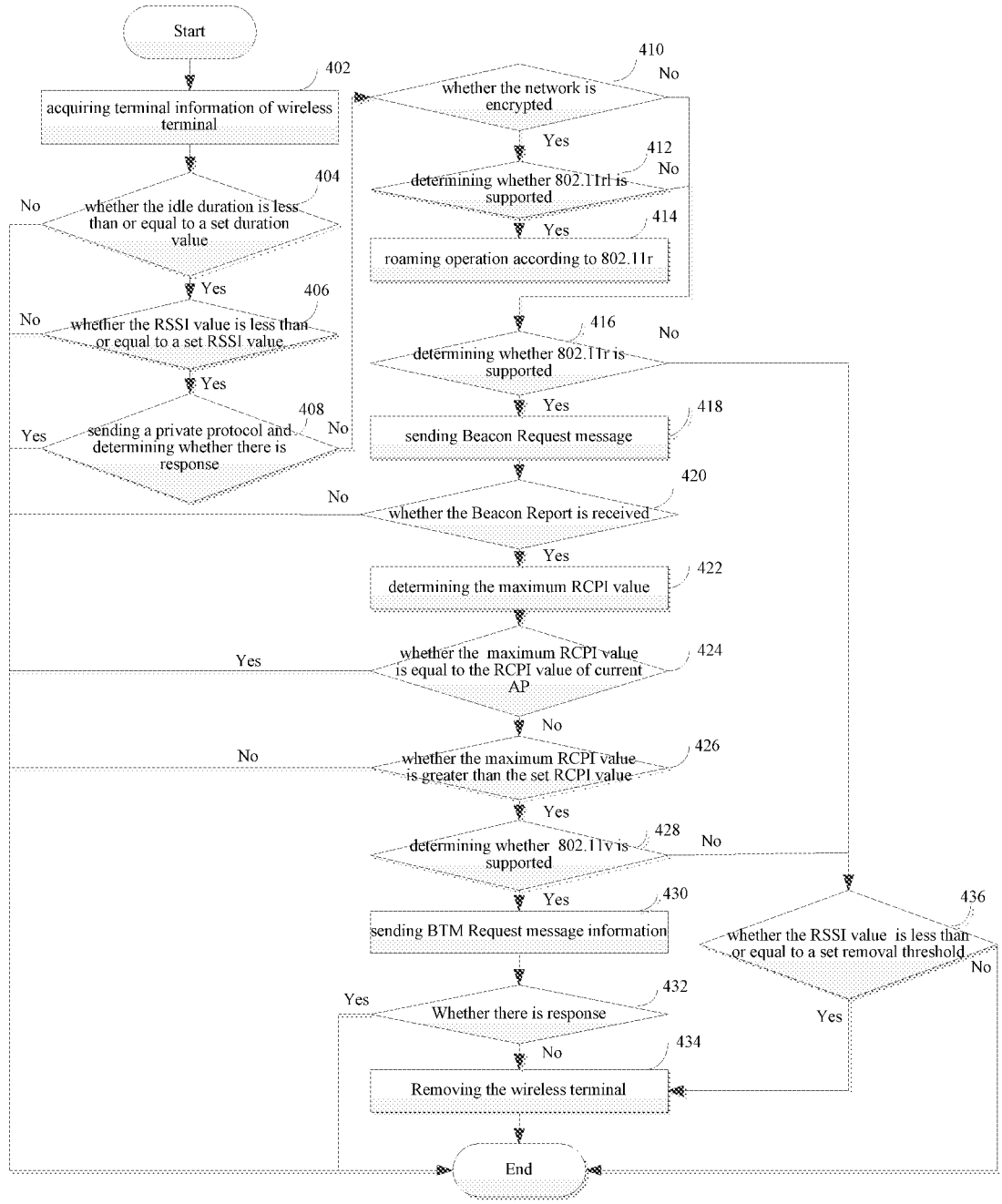
FIG. 4 is a flowchart of a specific implementation of a wireless roaming method according to an embodiment of the present application.

FIG. 4 is a flowchart of a specific implementation of a wireless roaming method according to an embodiment of the present application. The method shown in FIG. 4 at least includes the following steps.

Step 402, acquiring periodically the terminal information of the currently accessing wireless terminal.

Wherein the above terminal information includes the MAC address, RSSI value and idle duration of the wireless terminal.

Step 404, determining, for each wireless terminal, whether the idle duration of the wireless terminal is less than or equal to a set duration value; if so, performing step 406, otherwise, ending the process.

Step 406, determining whether the RSSI value of the wireless terminal is less than or equal to a set RSSI value; if so, performing step 408, otherwise, ending the process.

Step 408, sending a private protocol to the wireless terminal, and detecting whether response information returned by the wireless terminal for the private protocol is received; if not received, performing step 410; otherwise, ending the process. Wherein, the above private protocol is used to search a local area network for the wireless terminal of a fixed placement type, for example a camera. Sending the private protocol to the wireless terminal refers to sending a message to the wireless terminal based on the private protocol. After receiving the message, the wireless terminal returns response information based on the private protocol.

Step 410, determining whether the wireless network in the area where the wireless terminal is located is an encrypted network; if so, performing step 412; otherwise, performing step 416.

Step 412, determining whether the wireless terminal supports an 802.11r-based roaming protocol; if so, performing step 414; otherwise, performing step 416.

Step 414, controlling the AP to initiate the roaming operation according to the 802.11r-based roaming protocol.

Step 416, determining whether the wireless terminal supports the 802.11r-based roaming protocol; if so, performing step 418; otherwise, performing step 436.

Step 418, sending Beacon Request message information to the roaming terminal according to the MAC address of the wireless terminal. Wherein, the above Beacon Request message information is used to request AP information of the AP in the area where the wireless terminal is located.

Step 420, detecting whether the Beacon Report message information returned by the wireless terminal is received, and if so, performing step 422; otherwise, ending the process. Wherein, the Beacon Report message information carries the RCPI value, MAC address, and channel information of each of APs.

Step 422, parsing the above Beacon Report message information, and determining the maximum RCPI value in the message information.

Step 424, determining whether the above maximum RCPI value is equal to the RCPI value of the AP currently accessed by the wireless terminal; if so, ending the process; otherwise, performing step 426.

Step 426, determining whether the maximum RCPI value is greater than the set RCPI value; if so, performing step 428; otherwise, ending the process.

Step 428, determining whether the wireless roaming protocols supported by the wireless terminal include an 802.11v-based roaming protocol; if so, performing step 430; otherwise, performing step 436.

Step 430: controlling the AP to send the BTM Request message information to the wireless terminal.

Wherein, the above BTM Request message information carries AP information of the AP corresponding to the maximum RCPI value, so as to instruct the wireless terminal to access the AP based on the AP information.

Step 432, determining whether the BTM Response returned by the wireless terminal is received within a set time length; if so, ending the process; otherwise, performing step 434.

Step 434, controlling the AP to remove the wireless terminal.

Step 436, determining whether the RSSI value of the wireless terminal is less than or equal to a set removal threshold; if so, performing step 434; otherwise, ending the process and waiting for a next cycle.

By using the wireless roaming method provided by the embodiments of the present invention, for the roaming of a wireless terminal, the roaming operation is performed on the roaming terminal according to the wireless roaming protocols supported by the roaming terminal. Thus, for the roaming of a wireless terminal, the most appropriate roaming protocol is adopted according to the roaming protocol supported by the roaming terminal to realize the roaming of the roaming terminal. In this way, the problem of roaming delay, packet loss or disconnection caused by selecting an inappropriate roaming protocol to realize the roaming of the roaming terminal can be avoided to the maximum extent, thereby improving the roaming experience of the user.

The embodiment of the present application also provides an AP (wireless access device), including:

a wireless transceiver, configured for receiving terminal information of each wireless terminal of wireless terminals currently accessing the AP; wherein the terminal information at least includes an RSSI (Received Signal Strength Indication) value and an idle duration of the wireless terminal;

a processor, configured for determining a roaming terminal currently in an active state from the wireless terminals according to the RSSI value and the idle duration of each wireless terminal; determining, for each roaming terminal, wireless roaming protocols supported by the roaming terminal; wherein, the wireless roaming protocols include an 802.11k-based roaming protocol, an 802.11r-based roaming protocol, and an 802.11v-based roaming protocol; performing a roaming operation on the roaming terminal according to the wireless roaming protocols supported by the roaming terminal;

a processor, configured for storing data during running of the AP.

In one possible implementation, the processor is specifically configured for: determining, for each wireless terminal, whether the idle duration of the wireless terminal is less than or equal to a set duration value; if so, determining that the wireless terminal is in an active state, and determining whether the RSSI value of the wireless terminal is less than or equal to a set RSSI value; if so, sending a private protocol to the wireless terminal through the wireless transceiver, and detecting whether the wireless transceiver receives response information from the wireless terminal for the private protocol; wherein, the private protocol is used to search a local area network for a wireless terminal of a fixed-placement type; if the wireless transceiver does not receive response information from the wireless terminal for the private protocol, determining that the wireless terminal is the roaming terminal.

In one possible implementation, the processor is specifically configured for: acquiring, for each roaming terminal, protocol-related information of the roaming terminal; wherein the protocol-related information includes driving code information of the roaming terminal and message information received and sent by the roaming terminal; extracting protocol-related field information from the protocol-related information; determining whether a wireless network in an area where the wireless terminal is located is an encrypted network; if so, determining according to the field information whether the roaming terminal supports the 802.11r-based roaming protocol; if the wireless network is not an encrypted network or the roaming terminal does not support the 802.11r-based roaming protocol, determining according to the field information whether the roaming terminal supports the 802.11k-based roaming protocol and the 802.11v-based roaming protocol.

In one possible implementation, if the wireless roaming protocols supported by the roaming terminal include the 802.11r-based roaming protocol; correspondingly, the processor is specifically configured for controlling the AP to initiate the roaming operation according to the 802.11r-based roaming protocol.

In one possible implementation, if the wireless roaming protocols supported by the roaming terminal include the 802.11k-based roaming protocol, and the terminal information further includes a MAC address (media access control address) of the wireless terminal;
  correspondingly, the processor is specifically configured for:
  determining AP information of each AP of APs in an area where the roaming terminal is located according to the MAC address of the roaming terminal and the 802.11k-based roaming protocol; wherein, the AP information at least includes an RCPI (Received Channel Power Indicator) value of the AP;
  determining whether a maximum RCPI value in the RCPI values of the APs is not equal to the RCPI value of an AP currently accessed by the roaming terminal, and determining whether the maximum RCPI value is greater than a set threshold;
  if so, determining whether the wireless roaming protocols supported by the roaming terminal include the 802.11v-based roaming protocol;
  if it is determined that the wireless roaming protocols supported by the roaming terminal include the 802.11v-based roaming protocol, controlling the AP to perform a roaming operation on the roaming terminal according to the 802.11v-based roaming protocol; otherwise, controlling the AP to remove the roaming terminal.

In one possible implementation, the processor is specifically configured for: sending, if it is determined that the wireless roaming protocols supported by the roaming terminal include the 802.11v-based roaming protocol, access indication information to the roaming terminal through the wireless transceiver; wherein the access indication information carries AP information of an AP corresponding to the maximum RCPI value to instruct the roaming terminal to access the AP based on the AP information; determining whether access response information returned by the roaming terminal is received within a set duration; controlling the AP to remove the roaming terminal if the access response information is not received.

In one possible implementation, if the wireless roaming protocols supported by the roaming terminal only include the 802.11v-based roaming protocol; or the roaming terminal does not support any wireless roaming protocol; correspondingly, the processor is specifically configured for determining whether the RSSI value of the roaming terminal is less than or equal to a set removal threshold; if so, controlling the AP to remove the roaming terminal.

Figure 5:
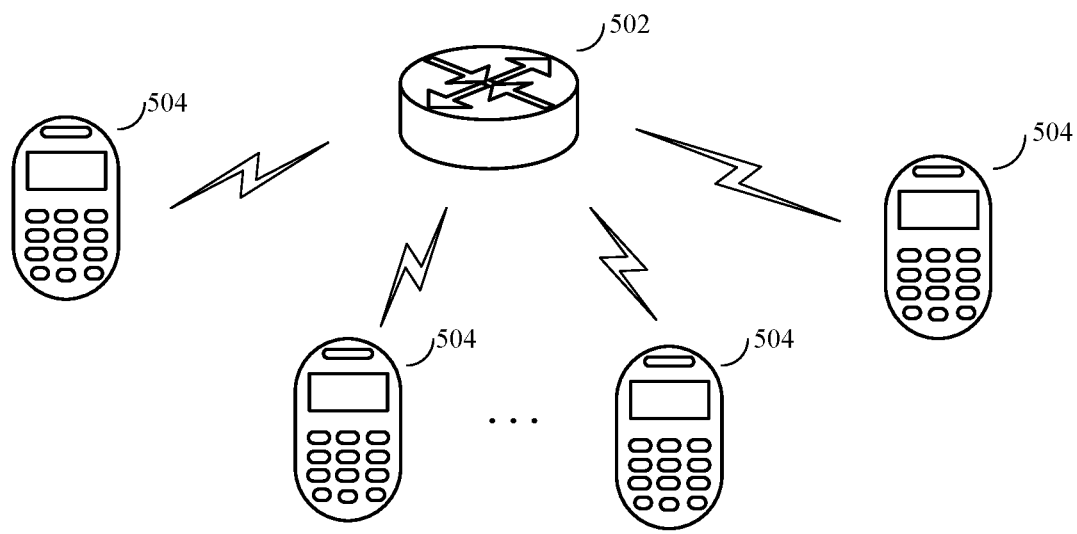
FIG. 5 is a schematic structural diagram of a wireless roaming system according to an embodiment of the present application.

Corresponding to the wireless roaming method provided by the above embodiments, based on the same technical concept, an embodiment of the present invention also provides a wireless roaming system. FIG. 5 is a schematic structural diagram of a wireless roaming system according to an embodiment of the present application, as shown in FIG. 5, the wireless roaming system includes an AP 502 and wireless terminals 504 accessing the AP;

The AP 502 is configured for acquiring terminal information of each wireless terminal of wireless terminals 504; wherein the terminal information at least includes an RSSI value and an idle duration of the wireless terminal 504; determining a roaming terminal currently in an active state from the wireless terminals according to the RSSI value and the idle duration of each wireless terminal; determining, for each roaming terminal, wireless roaming protocols supported by the roaming terminal; performing a roaming operation on the roaming terminal according to the wireless roaming protocols supported by the roaming terminal; wherein, the wireless roaming protocols include an 802.11k-based roaming protocol, an 802.11r-based roaming protocol, and an 802.11v-based roaming protocol.

Wherein, the number of wireless terminals 504 accessing the AP may be one or more than one. FIG. 5 only takes the number of wireless terminals accessing the AP as more than one as an example for illustrative description, and does not constitute a limitation on the embodiments of the present application.

In one possible implementation, the AP 502 is specifically configured for:
  determining, for each wireless terminal, whether the idle duration of the wireless terminal is less than or equal to a set duration value; if so, determining that the wireless terminal is in an active state, and determining whether the RSSI value of the wireless terminal is less than or equal to the set RSSI value; if so, sending a private protocol to the wireless terminal, and detecting whether response information is received from the wireless terminal for the private protocol; wherein, the private protocol is used to search a local area network for a wireless terminal of a fixed-placement type; if no response information is received from the wireless terminal for the private protocol, determining that the wireless terminal is the roaming terminal.

In one possible implementation, the AP 502 is specifically configured for:
  acquiring, for each roaming terminal, protocol-related information of the roaming terminal; wherein the protocol-related information includes driving code information of the roaming terminal and message information sent and received by the roaming terminal; extracting protocol-related field information from the protocol-related information; determining whether a wireless network in an area where the wireless terminal is located is an encrypted network; if so, determining according to the field information whether the roaming terminal supports the 802.11r-based roaming protocol; if the wireless network is not an encrypted network or the roaming terminal does not support the 802.11r-based roaming protocol, then determining according to the field information whether the roaming terminal supports the 802.11k-based roaming protocol and the 802.11v-based roaming protocol.

In one possible implementation, if the wireless roaming protocols supported by the roaming terminal include an 802.11r-based roaming protocol;

Correspondingly, the AP 502 is specifically configured for:

controlling the AP to initiate the roaming operation according to the 802.11r-based roaming protocol.

In one possible implementation, if the wireless roaming protocols supported by the roaming terminal include the 802.11k-based roaming protocol, and the terminal information further includes the MAC address (media access control address) of the wireless terminal.

Correspondingly, the AP 502 is specifically configured for:

determining AP information of each AP of APs in an area where the roaming terminal is located according to the MAC address of the roaming terminal and the 802.11k-based roaming protocol; wherein the AP information at least includes an RCPI (receiving channel power indicator) value of the AP; determining whether a maximum RCPI value in the RCPI values of the APs is not equal to the RCPI value of an AP currently accessed by the roaming terminal, and determining whether the maximum RCPI value is greater than a set threshold; if so, determining whether the wireless roaming protocols supported by the roaming terminal include the 802.11v-based roaming protocol; if the wireless roaming protocols supported by the roaming terminal include the 802.11v-based roaming protocol, controlling the AP to perform a roaming operation on the roaming terminal according to the 802.11v-based roaming protocol; otherwise, controlling the AP to remove the roaming terminal.

In one possible implementation, the AP 502 is specifically configured for:

controlling the AP to send access indication information to the roaming terminal; wherein, the access indication information carries the AP information of the AP corresponding to the maximum RCPI value to instruct the roaming terminal to access the above AP based on the AP information; determining whether the access response information returned by the roaming terminal is received in a set duration; controlling, if the access response information is not received, the AP to remove the roaming terminal.

In one possible implementation, if the wireless roaming protocols supported by the roaming terminal only include the 802.11v-based roaming protocol; or the roaming terminal does not support any wireless roaming protocol.

Correspondingly, the AP 502 is specifically configured for:

determining whether the RSSI value of the roaming terminal is less than or equal to a set removal threshold; if so, controlling the AP to remove the roaming terminal.

It can be understood that the wireless access device and the wireless roaming system provided by the embodiments of the present application are based on the same inventive concept as the wireless roaming method provided by the embodiments of the present application. Therefore, the specific implementation of this embodiment may refer to the implementation of the aforementioned wireless roaming method, and will not be repeatedly described again.

By using the wireless accessing device and wireless roaming system provided by the embodiments of the present invention, for the roaming of a wireless terminal, the roaming operation is performed on the roaming terminal according to the wireless roaming protocols supported by each roaming terminal. Thus, for the roaming of a wireless terminal, the most appropriate roaming protocol is adopted according to the roaming protocol supported by the roaming terminal to realize the roaming of the roaming terminal. In this way, the problem of roaming delay, packet loss or disconnection caused by selecting an inappropriate roaming protocol to realize the roaming of the roaming terminal can be avoided to the maximum extent, thereby improving the roaming experience of the user.

Figure 6:
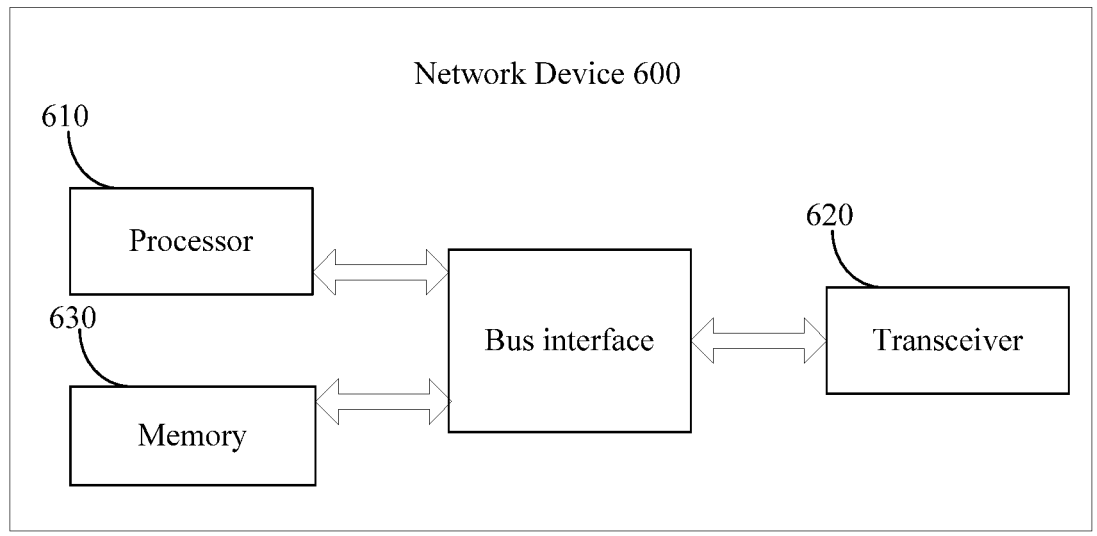
FIG. 6 is a schematic diagram illustrating the module composition of a network device according to an embodiment of the present application.

Corresponding to a wireless roaming method provided by an embodiment of the present invention, based on the same idea, an embodiment of the present invention provides a network device. Referring to FIG. 6, the network device 600 includes a processor 610, a transceiver 620, a memory 630, and a bus interface. Wherein:

in the embodiment of the present invention, the network device 600 further includes computer programs stored on the memory 630 and executable on the processor 610 that, when executed by the processor 610, cause the processor to implement the above wireless roaming method, and the same technical effect can be achieved. In order to avoid repetition, it will not be repeated here.

In FIG. 6, the bus architecture may include any number of interconnected buses and bridges, which are specifically linked together by various circuits of one or more processors represented by the processor 610 and the memory represented by the memory 630. The bus architecture may also link together various other circuits, such as peripheral devices, voltage regulators, and power management circuits, etc. which are well known in the art and, therefore, which will not be described further herein. The bus interface provides an interface. The transceiver 620 may include multiple elements, including a transmitter and a receiver, which provide a unit for communicating with various other apparatus over a transmission medium.

The processor 610 is responsible for managing the bus architecture and general processing, and the memory 630 may store data used by the processor 610 when performing operations.

In yet another embodiment provided by the present application, a computer program product including instructions is also provided which, when running on a computer, causes the computer to perform any wireless roaming method in the above embodiments.

The embodiment of the present invention further provides a computer-readable storage medium having computer programs stored thereon which, when executed by a processor, cause the processor to implement any of the above method embodiments, and the same technical effect can be achieved. In order to avoid repetition, it will not be repeated here. The computer-readable storage medium is, for example, a read-only memory (ROM), a random access memory (RAM), a magnetic disk, or an optical disk.

It can be understood that the terms "include", "comprise" or any other variants thereof are intended to cover a non-exclusive inclusion, so that processes, methods, articles, or apparatus including a series of elements include not only those elements listed but also those not specifically listed or elements intrinsic to these processes, methods, articles, or apparatus. Without further limitations, elements defined by the sentences "comprise(s) a . . . " or "include(s) a . . . " do not exclude that there are other identical elements in the processes, methods, articles, or apparatus which include these elements.

Through the description of the above embodiments, those skilled in the art can clearly understand that the methods of the above embodiments can be implemented by means of software and necessary general hardware platforms, and of course, they can also be implemented by hardware, but in many cases, the former is a better implementation. Based on this understanding, the technical solution of the present disclosure, in essence, or a part contributing to the prior art or the part of the technical solution can be embodied in the form of a software product, the computer software product is stored in one storage medium (such as ROM/RAM, magnetic disk and optical disk), including several instructions to cause one computer device (which may be a mobile phone, a computer, a server, an air conditioner or a network device, etc) to perform the method of any of embodiments of the present invention.

The various embodiments in this specification are described in a related manner, and each embodiment focuses on the differences from other embodiments, and the same and similar parts between the various embodiments can be referred to each other.

The embodiments of the present invention have been described above in conjunction with the accompanying drawings, but the present invention is not limited to the above-mentioned specific implementation, which are merely illustrative rather than restrictive. Under the teaching of the present invention without departing from the spirit of the present invention and the scope protected by the claims, many forms can be made which all fall within the protection scope of the present invention.

What is claimed is:

1. A wireless roaming method, which is applied to a wireless access device AP, wherein the AP is in a coverage area of Wireless Local Area Network, there are wireless terminals in the coverage area of the Wireless Local Area Network, each wireless terminal of the wireless terminals accesses the AP for connecting to network and implements roaming based on wireless roaming protocols, the method comprises:
    acquiring, by the AP, terminal information of each wireless terminal of the wireless terminals currently accessing the AP; wherein the terminal information at least comprises an RSSI (Received Signal Strength Indication) value and an idle duration of the wireless terminal;
    determining, by the AP, a roaming terminal currently in an active state from the wireless terminals according to the RSSI value and the idle duration of each wireless terminal;
    determining, by the AP, for each roaming terminal, wireless roaming protocols supported by the roaming terminal; wherein the wireless roaming protocols comprise an 802.11k-based roaming protocol, an 802.11r-based roaming protocol and an 802.11v-based roaming protocol;
    performing, by the AP, a roaming operation on the roaming terminal according to the wireless roaming protocols supported by the roaming terminal, so as to improve work efficiency of performing the roaming operation and save resources for adjusting roaming protocols.

2. The method of claim 1, wherein determining a roaming terminal currently in an active state from the wireless terminals according to the RSSI value and the idle duration of each wireless terminal comprises:
    determining, for each wireless terminal, whether the idle duration of the wireless terminal is less than or equal to a set duration value;
    if so, determining that the wireless terminal is in an active state, and determining whether the RSSI value of the wireless terminal is less than or equal to a set RSSI value;
    if so, sending a private protocol to the wireless terminal, and detecting whether response information is received from the wireless terminal for the private protocol;
    wherein the private protocol is used to search a local area network for a wireless terminal of a fixed-placement type;
    if no response information is received from the wireless terminal for the private protocol, determining that the wireless terminal is the roaming terminal.

3. The method of claim 1, wherein determining, for each roaming terminal, wireless roaming protocols supported by the roaming terminal, comprises:
    acquiring, for each roaming terminal, protocol-related information of the roaming terminal; wherein the protocol-related information comprises driving code information of the roaming terminal and message information received and sent by the roaming terminal;
    extracting protocol-related field information from the protocol-related information;
    determining whether a wireless network in an area where the wireless terminal is located is an encrypted network;
    if so, determining according to the field information whether the roaming terminal supports the 802.11r-based roaming protocol;
    if the wireless network is not an encrypted network or the roaming terminal does not support the 802.11r-based roaming protocol, determining according to the field information whether the roaming terminal supports the 802.11k-based roaming protocol and the 802.11v-based roaming protocol.

4. The method of claim 1, wherein if the wireless roaming protocols supported by the roaming terminal comprise the 802.11r-based roaming protocol,
    correspondingly, performing a roaming operation on the roaming terminal according to the wireless roaming protocols supported by the roaming terminal comprises:
    controlling the AP to initiate the roaming operation according to the 802.11r-based roaming protocol.

5. The method of claim 1, wherein if the wireless roaming protocols supported by the roaming terminal comprise the 802.11k-based roaming protocol, and the terminal information further comprises a MAC address (media access control address) of the wireless terminal,
    correspondingly, performing a roaming operation on the roaming terminal according to the wireless roaming protocols supported by the roaming terminal comprises:
    determining AP information of each AP of APs in an area where the roaming terminal is located according to the MAC address of the roaming terminal and the 802.11k-based roaming protocol; wherein, the AP information at least comprises an RCPI (Received Channel Power Indicator) value of the AP;

determining whether a maximum RCPI value in the RCPI values of the APs is not equal to the RCPI value of an AP currently accessed by the roaming terminal, and determining whether the maximum RCPI value is greater than a set threshold;
if so, determining whether the wireless roaming protocols supported by the roaming terminal comprise the 802.11v-based roaming protocol;
if the wireless roaming protocols supported by the roaming terminal comprise the 802.11v-based roaming protocol, controlling the AP to perform a roaming operation on the roaming terminal according to the 802.11v-based roaming protocol; otherwise, controlling the AP to remove the roaming terminal.

6. The method of claim 5, wherein controlling the AP to perform a roaming operation on the roaming terminal according to the 802.11v-based roaming protocol comprises:
controlling the AP to send access indication information to the roaming terminal; wherein the access indication information carries AP information of an AP corresponding to the maximum RCPI value to instruct the roaming terminal to access the AP based on the AP information;
determining whether access response information returned by the roaming terminal is received within a set duration;
controlling the AP to remove the roaming terminal if the access response information is not received.

7. The method of claim 1, wherein if the wireless roaming protocols supported by the roaming terminal only comprise the 802.11v-based roaming protocol; or the roaming terminal does not support any wireless roaming protocol,
correspondingly, performing a roaming operation on the roaming terminal according to the wireless roaming protocols supported by the roaming terminal comprises:
determining whether the RSSI value of the roaming terminal is less than or equal to a set removal threshold;
if so, controlling the AP to remove the roaming terminal.

8. A wireless roaming system, wherein the system comprises an AP and wireless terminals accessing the AP,
both the AP and the wireless terminals are in a coverage area of Wireless Local Area Network, each wireless terminal of the wireless terminals accesses the AP for connecting to network and implements roaming based on wireless roaming protocols, and
the AP is configured for acquiring terminal information of each wireless terminal of the wireless terminals; wherein the terminal information at least comprises an RSSI (Received Signal Strength Indication) value and an idle duration of the wireless terminal; determining a roaming terminal currently in an active state from the wireless terminals according to the RSSI value and the idle duration of each wireless terminal; determining, for each roaming terminal, wireless roaming protocols supported by the roaming terminal; performing a roaming operation on the roaming terminal according to the wireless roaming protocols supported by the roaming terminal, so as to improve work efficiency of performing the roaming operation and save resources for adjusting roaming protocols; wherein, the wireless roaming protocols comprise an 802.11k-based roaming protocol, an 802.11r-based roaming protocol, and an 802.11v-based roaming protocol.

9. The system of claim 8, if the wireless roaming protocols supported by the roaming terminal comprise the 802.11r-based roaming protocol,
correspondingly, the AP is specifically configured for:
controlling the AP to initiate the roaming operation according to the 802.11r-based roaming protocol.

10. The system of claim 8, wherein if the wireless roaming protocols supported by the roaming terminal comprise the 802.11k-based roaming protocol, and the terminal information further comprises a MAC address (media access control address) of the wireless terminal,
correspondingly, the AP is specifically configured for:
determining AP information of each AP of APs in an area where the roaming terminal is located according to the MAC address of the roaming terminal and the 802.11k-based roaming protocol; wherein the AP information at least comprises an RCPI (receiving channel power indicator) value of the AP; determining whether a maximum RCPI value in the RCPI values of the APs is not equal to the RCPI value of an AP currently accessed by the roaming terminal, and determining whether the maximum RCPI value is greater than a set threshold; if so, determining whether the wireless roaming protocols supported by the roaming terminal comprise the 802.11v-based roaming protocol; if the wireless roaming protocols supported by the roaming terminal comprise the 802.11v-based roaming protocol, controlling the AP to perform a roaming operation on the roaming terminal according to the 802.11v-based roaming protocol; otherwise, controlling the AP to remove the roaming terminal.

11. The system of claim 8, wherein if the wireless roaming protocols supported by the roaming terminal only comprise the 802.11v-based roaming protocol; or the roaming terminal does not support any wireless roaming protocol,
correspondingly, the AP is specifically configured for:
determining whether the RSSI value of the roaming terminal is less than or equal to a set removal threshold;
if so, controlling the AP to remove the roaming terminal.

12. A wireless access device AP, wherein the AP is in a coverage area of Wireless Local Area Network, there are wireless terminals in the coverage area of the Wireless Local Area Network, each wireless terminal of the wireless terminals accesses the AP for connecting to network and implements roaming based on wireless roaming protocols, the AP comprises:
a wireless transceiver, configured for receiving terminal information of each wireless terminal of wireless terminals currently accessing the AP; wherein the terminal information at least comprises an RSSI (Received Signal Strength Indication) value and an idle duration of the wireless terminal;
a processor, configured for determining a roaming terminal currently in an active state from the wireless terminals according to the RSSI value and the idle duration of each wireless terminal; determining, for each roaming terminal, wireless roaming protocols supported by the roaming terminal; wherein, the wireless roaming protocols comprise an 802.11k-based roaming protocol, an 802.11r-based roaming protocol, and an 802.11v-based roaming protocol; performing a roaming operation on the roaming terminal according to the wireless roaming protocols supported by the roaming terminal, so as to improve work efficiency of performing the roaming operation and save resources for adjusting roaming protocols; and
a processor, configured for storing data during running of the AP.

13. The wireless access device AP of claim 12, wherein the processor is specifically configured for: determining, for each wireless terminal, whether the idle duration of the wireless terminal is less than or equal to a set duration value; if so, determining that the wireless terminal is in an active state, and determining whether the RSSI value of the wireless terminal is less than or equal to a set RSSI value; if so, sending a private protocol to the wireless terminal through the wireless transceiver, and detecting whether the wireless transceiver receives response information from the wireless terminal for the private protocol; wherein, the private protocol is used to search a local area network for a wireless terminal of a fixed-placement type; if the wireless transceiver does not receive response information from the wireless terminal for the private protocol, determining that the wireless terminal is the roaming terminal.

14. The wireless access device AP of claim 12, wherein the processor is specifically configured for: acquiring, for each roaming terminal, protocol-related information of the roaming terminal; wherein the protocol-related information comprises driving code information of the roaming terminal and message information received and sent by the roaming terminal; extracting protocol-related field information from the protocol-related information; determining whether a wireless network in an area where the wireless terminal is located is an encrypted network; if so, determining according to the field information whether the roaming terminal supports the 802.11r-based roaming protocol; if the wireless network is not an encrypted network or the roaming terminal does not support the 802.11r-based roaming protocol, determining according to the field information whether the roaming terminal supports the 802.11k-based roaming protocol and the 802.11v-based roaming protocol.

15. The wireless access device AP of claim 12, wherein if the wireless roaming protocols supported by the roaming terminal comprise the 802.11r-based roaming protocol; correspondingly, the processor is specifically configured for controlling the AP to initiate the roaming operation according to the 802.11r-based roaming protocol.

16. The wireless access device AP of claim 12, wherein if the wireless roaming protocols supported by the roaming terminal comprise the 802.11k-based roaming protocol, and the terminal information further comprises a MAC address (media access control address) of the wireless terminal; correspondingly, the processor is specifically configured for:
determining AP information of each AP of APs in an area where the roaming terminal is located according to the MAC address of the roaming terminal and the 802.11k-based roaming protocol; wherein, the AP information at least comprises an RCPI (Received Channel Power Indicator) value of the AP;
determining whether a maximum RCPI value in the RCPI values of the APs is not equal to the RCPI value of an AP currently accessed by the roaming terminal, and determining whether the maximum RCPI value is greater than a set threshold;
if so, determining whether the wireless roaming protocols supported by the roaming terminal comprise the 802.11v-based roaming protocol;
if it is determined that the wireless roaming protocols supported by the roaming terminal comprise the 802.11v-based roaming protocol, controlling the AP to perform a roaming operation on the roaming terminal according to the 802.11v-based roaming protocol; otherwise, controlling the AP to remove the roaming terminal.

17. The wireless access device AP of claim 16, wherein the processor is specifically configured for: sending, if it is determined that the wireless roaming protocols supported by the roaming terminal comprise the 802.11v-based roaming protocol, access indication information to the roaming terminal through the wireless transceiver; wherein the access indication information carries AP information of an AP corresponding to the maximum RCPI value to instruct the roaming terminal to access the AP based on the AP information; determining whether access response information returned by the roaming terminal is received within a set duration; controlling the AP to remove the roaming terminal if the access response information is not received.

18. The wireless access device AP of claim 12, wherein if the wireless roaming protocols supported by the roaming terminal only comprise the 802.11v-based roaming protocol; or the roaming terminal does not support any wireless roaming protocol; correspondingly, the processor is specifically configured for determining whether the RSSI value of the roaming terminal is less than or equal to a set removal threshold; if so, controlling the AP to remove the roaming terminal.

19. A computer device, comprising a processor, a communication interface, a memory, and a communication bus, wherein the processor, the communication interface, and the memory communicate with each other through the communication bus; the memory is configured for storing computer programs; and the processor is configured for performing programs stored on the memory to implement the method of claim 1.

20. A non-transitory computer-readable storage medium storing computer programs that, when executed by a processor, cause the processor to implement the method of claim 1.

* * * * *